July 26, 1932.  H. D. GEYER  1,869,099
STEERING WHEEL
Filed May 2, 1930  2 Sheets-Sheet 1

Inventor
Harvey D. Geyer
By Spencer Hardman & Fehr
his Attorneys

July 26, 1932. H. D. GEYER 1,869,099
STEERING WHEEL
Filed May 2, 1930   2 Sheets-Sheet 2

Inventor
Harvey D. Geyer
By Spencer Hardman & Fehr
his Attorneys

Patented July 26, 1932

1,869,099

UNITED STATES PATENT OFFICE

HARVEY D. GEYER, OF DAYTON, OHIO, ASSIGNOR TO THE INLAND MANUFACTURING COMPANY, OF DAYTON, OHIO, A CORPORATION OF DELAWARE

STEERING WHEEL

Application filed May 2, 1930. Serial No. 449,208.

This invention relates to handwheels which are adapted for use as steering wheels on automotive vehicles.

Molded composition steering wheels having a metal reinforcement embedded in the rim, spokes and hub are now known. However heretofore, so far as I am aware, the reinforcing metal skeletons have been of such costly construction in order to obtain the desired strength and rigidity that such reinforced wheels have been necessarily relatively expensive compared to other types of steering wheels. Now an object of this invention is to provide a metal reinforced molded composition wheel of suitable strength and high efficiency but which can be very economically manufactured due to the simple and cheap construction of the metal skeleton and the method of making same.

Another object is to provide such a wheel which will buckle or bend out of shape rather than break apart in case the driver's body is hurled violently thereagainst in a serious crash. In such event there will be no projecting spokes or rim portion which may pierce the driver's body, and also the bending of the wheel will serve as a yielding stop for the driver's body and thus reduce his injuries.

Further objects and advantages of the present invention will be apparent from the following description, reference being had to the accompanying drawings wherein a preferred embodiment of one form of the present invention is clearly shown.

In the drawings.

Similar reference characters prefer to similar parts throughout the several views.

Figure 5:
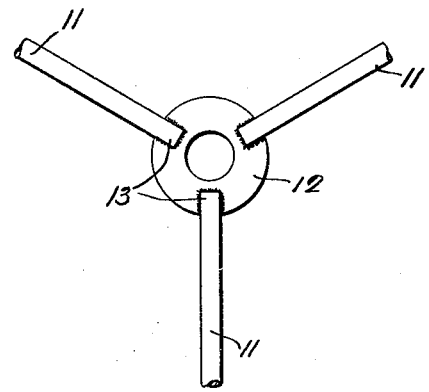
Figs. 5 and 6 illustrate a method of construction, showing three spoke rods welded to the top surface of the second hub plate from the top prior to the five hub plates being stacked and welded together.
Figure 6:
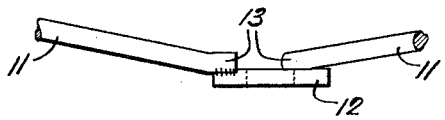
Figure 4:
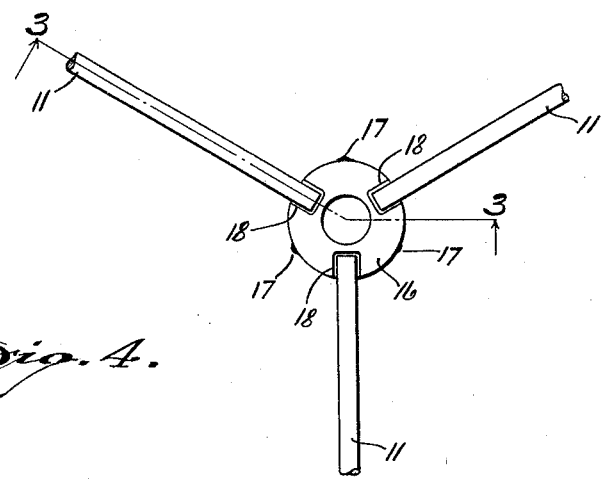
Fig. 4 is a plan view of the central portion of Fig. 3.
Figure 3:
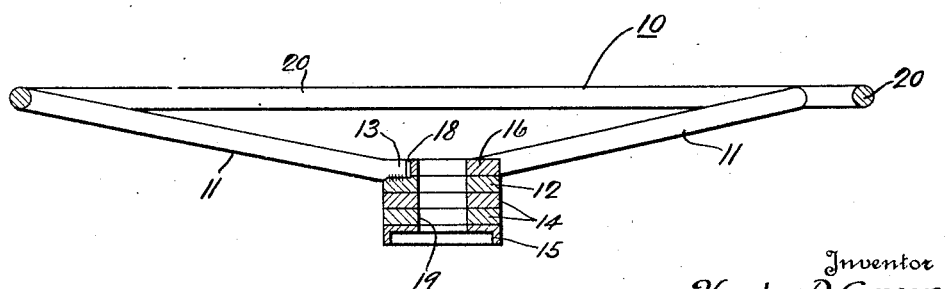
Fig. 3 is a section through the reinforcing metal skeleton, the section through the hub being taken on line 3—3 of Fig. 4.

In forming the metal skeleton, designated in its entirety by numeral 10, the three spoke rods 11 preferably first have their inner ends 13 welded to the top surface of the hub plate 12 at the desired angular relation so as to form a dished spider, as clearly shown in Figs. 5 and 6. The remaining hub plates 14, 15 and 16 are thereafter stacked upon each other as shown in Fig. 3, and rigidly welded together to form a rigid metal hub with the spoke rods 11 welded thereto. Preferably the hub plates are electrically welded together along their vertical edges at three places shown at 17 in Fig. 4. Of course if desired the hub plates may be welded together at other places or in other well known manner but the above described method of welding provides a very simple and efficient method. The top hub plate 16 has the spoke-receiving radial recesses 18 formed therein prior to stacking so that the plate 16 may set flat upon the second plate 12 and have its top surface substantially flush with that of the spoke ends 13 (see Fig. 3).

The endless metal rim ring 20 is preferably formed from round steel rods having same diameter as the steel spoke rods 11, the ends of the ring being joined by a butt weld. The outer ends of spoke rods 11 abut against the rim ring 20 and are welded directly thereto, thus forming a very strong and efficient but economically made metal skeleton which is adapted to be suitably inserted in a mold cavity and have a composition covering molded thereupon.

Figure 1:
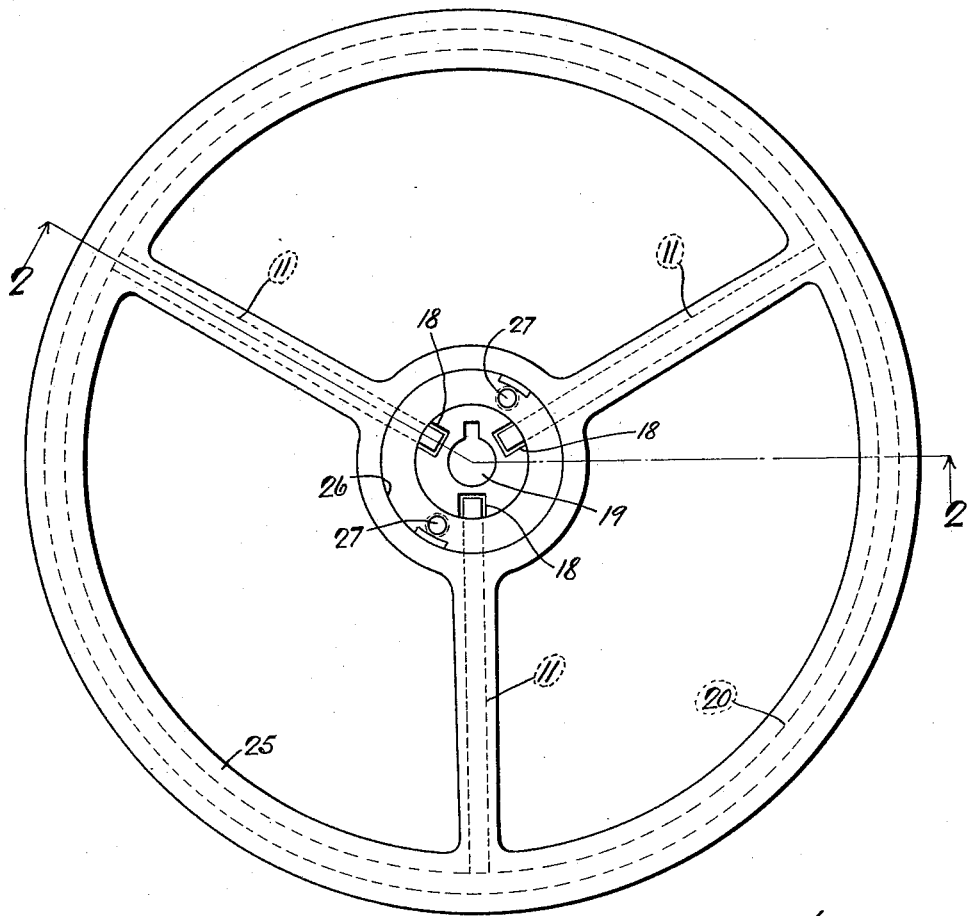
Fig. 1 is a plan view of an automobile steering wheel made according to this invention.
Figure 2:
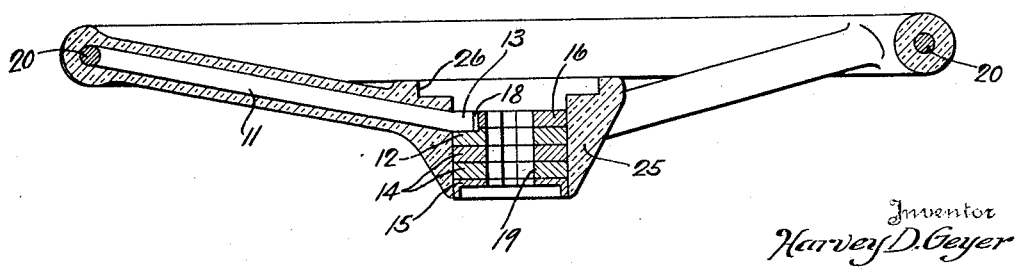
Fig. 2 is a section taken on line 2—2 of Fig. 1.

Figs. 1 and 2 show the completed wheel with the molded composition 25 encasing the rim ring 20, the spoke rods 11, and the metal hub except on its upper and lower faces. The composition 25 may be any suitable non-metallic molding composition, such as an artificial resin compound containing paper fiber or other fibrous material, or a hard rubber compound. With any composition the metal skeleton may be properly located in the mold cavity by mold parts which enter the hub bore 19 and also fit snugly against the upper and lower faces of the metal hub. Preferably an open top central recess 26 is molded in the composition hub 25 for the purpose of mounting a horn button or other control device upon the steering wheel. Fig. 1 illustrates two vertical holes 27 extending through the molded hub 25, through which operating parts associated with the horn button or other device may extend. These holes 27 may be very economically made simply by coring since the metal hub is sufficiently small in diameter that said holes 27 do not have to pass through any metal parts.

The rim ring 20 and spokes 11 are preferably made from round steel about five-sixteenths inch in diameter so that the completed wheel will bend out of shape or collapse by bending rather than by a breaking apart of the metal skeleton when a severe stress is put thereupon.

While the form of embodiment of the present invention as herein disclosed, constitutes a preferred form, it is to be understood that other forms might be adopted, all coming within the scope of the claims which follow.

What is claimed is as follows:

1. A molded composition handwheel having a reinforcing metal skeleton embedded therein, said skeleton comprising: a plurality of metal plates stacked and welded together forming a hub, one plate of said hub having radial recesses therein, an endless metal rim ring, and spoke rods welded to said rim ring at their outer ends and having their inner ends fitting within said radial recesses and welded rigidly to said hub.

2. A molded composition handwheel having a reinforcing metal skeleton embedded therein, said skeleton comprising: a plurality of metal plates stacked and welded together forming a hub, the top plate of said hub having radial recesses therein, an endless metal rim ring, and spoke rods welded to said rim ring at their outer ends and having their inner ends inserted in said recesses and welded to said hub.

3. A molded composition handwheel having a reinforcing metal skeleton embedded therein, said skeleton comprising: a plurality of metal plates stacked and welded together forming a hub, the top plate of said hub having radial recesses therein, an endless metal rim ring, and spoke rods fixed to said rim ring at their outer ends and having their inner ends inserted in said radial recesses and welded to the next adjacent plate of said hub.

In testimony whereof I hereto affix my signature.

HARVEY D. GEYER.